United States Patent
Strandborg et al.

(10) Patent No.: US 12,106,735 B1
(45) Date of Patent: Oct. 1, 2024

(54) SYSTEM AND METHOD OF REMOTE RENDERING BASED ON SMOOTH PURSUIT MOVEMENT

(71) Applicant: Varjo Technologies Oy, Helsinki (FI)

(72) Inventors: Mikko Strandborg, Helsinki (FI); Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/505,887

(22) Filed: Nov. 9, 2023

(51) Int. Cl.
| | | |
|---|---|---|
| *G09G 5/391* | (2006.01) | |
| *G02B 27/00* | (2006.01) | |
| *G02B 27/01* | (2006.01) | |
| *G06F 3/01* | (2006.01) | |
| *G06T 19/00* | (2011.01) | |
| *G06V 10/20* | (2022.01) | |

(52) U.S. Cl.
CPC ......... *G09G 5/391* (2013.01); *G02B 27/0093* (2013.01); *G02B 27/0172* (2013.01); *G06F 3/013* (2013.01); *G06T 19/006* (2013.01); *G06V 10/255* (2022.01); *G09G 2340/0407* (2013.01)

(58) Field of Classification Search
CPC ........... G09G 5/391; G09G 2340/0407; G02B 27/0093; G02B 27/0172; G06F 3/013; G06T 19/006; G06V 10/255
See application file for complete search history.

(56) References Cited

U.S. PATENT DOCUMENTS

| | | | | |
|---|---|---|---|---|
| 10,192,528 | B2 * | 1/2019 | Young | G09G 5/391 |
| 10,684,685 | B2 * | 6/2020 | Young | H04N 19/124 |
| 10,720,128 | B2 * | 7/2020 | Young | G09G 5/391 |
| 11,287,884 | B2 * | 3/2022 | Young | H04N 19/167 |
| 11,314,325 | B2 * | 4/2022 | Young | G02B 27/017 |
| 11,335,303 | B2 * | 5/2022 | Jarvenpaa | G09G 5/37 |
| 11,836,289 | B2 * | 12/2023 | Young | G02B 27/017 |
| 2017/0287446 | A1 * | 10/2017 | Young | G09G 5/391 |
| 2019/0156794 | A1 * | 5/2019 | Young | G06F 3/013 |
| 2019/0361526 | A1 * | 11/2019 | Young | G06F 3/147 |
| 2020/0301506 | A1 * | 9/2020 | Young | G02B 27/017 |
| 2021/0174768 | A1 * | 6/2021 | Jarvenpaa | G06F 3/013 |
| 2021/0303067 | A1 * | 9/2021 | Young | H04N 19/124 |
| 2022/0197381 | A1 * | 6/2022 | Young | G02B 27/017 |
| 2024/0103620 | A1 * | 3/2024 | Young | H04N 19/124 |

\* cited by examiner

*Primary Examiner* — Michael Pervan
(74) *Attorney, Agent, or Firm* — Ziegler IP Law Group LLC

(57) ABSTRACT

Disclosed is a system with at least one server that is communicably coupled to at least one display apparatus, wherein the at least one server is configured to detect start of a smooth pursuit movement based on eye movements information received from the at least one display apparatus; detect an object or image region in motion in a field of view displayed by the at least one display apparatus; control remote rendering of an extended reality (XR) video stream by dynamically adjusting video compression and foveation parameters of the XR video stream during the smooth pursuit movement to prioritize visual clarity of the detected object or image region in motion over other elements in the captured field of view; detect an end of the smooth pursuit movement; and revert the video compression and foveation parameters to pre-set default settings after the end of the smooth pursuit movement.

14 Claims, 2 Drawing Sheets

SYSTEM AND METHOD OF REMOTE RENDERING BASED ON SMOOTH PURSUIT MOVEMENT

TECHNICAL FIELD

The present disclosure relates to systems for remote rendering. The present disclosure also relates to methods of remote rendering based on smooth pursuit movement.

BACKGROUND

In recent times, the field of extended reality (XR) technology has witnessed substantial growth and adoption over the years. Such growth and adoption maybe quite high in the case of evolving technologies, such as immersive extended-reality (XR) technologies, which are being employed in various fields such as entertainment, real estate, training, medical imaging operations, simulators, navigation, and the like. Such immersive XR technologies create XR environments for presentation to users of XR devices (such as an XR headset, pairs of XR glasses, or other devices).

However, existing equipment and techniques for generating images have several problems associated therewith. For example, the existing equipment and techniques are typically inefficient in adapting to the dynamic nature of human vision during head and eye movements. The existing equipment and techniques fail to maintain visual clarity and comfort for users, particularly during head and eye movements, leading to a reduced image quality and discomfort, hindering the immersive experience, which is not desirable. In addition, the existing equipment and techniques struggle to adapt to users' visual acuity and perception, limiting the realistic experience XR can offer.

Therefore, in light of the foregoing discussion, there exists a need to overcome the aforementioned drawbacks.

SUMMARY

The aim of the present disclosure is to provide a system and a method of remote rendering with an improved visual quality of extended reality (XR) transport during the time the eyes are in smooth pursuit motion. The aim of the present disclosure is achieved by a system and a method of remote rendering based on the smooth pursuit movement for enhancing the visual quality and comfort of XR experiences by dynamically adjusting video compression and foveation parameters during smooth pursuit eye movements, prioritizing the clarity of moving objects within the user's field of view, as defined in the appended independent claims to which reference is made. Advantageous features are set out in the appended dependent claims.

Throughout the description and claims of this specification, the words "comprise", "include", "have", and "contain" and variations of these words, for example, "comprising" and "comprises", mean "including but not limited to", and do not exclude other components, items, integers, or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
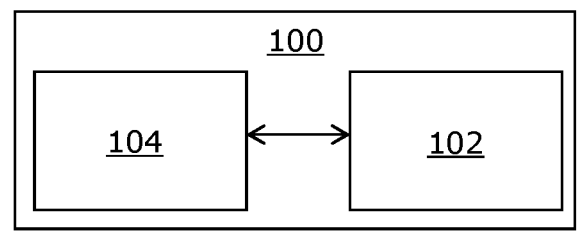
FIG. 1 is an illustration of a block diagram of an architecture of a system of remote rendering based on smooth pursuit movement, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising at least one server that is communicably coupled to at least one display apparatus, wherein the at least one server is configured to:

detect a start of a smooth pursuit movement (T1) based on eye movement information received from the at least one display apparatus;

detect an object or image region in motion in a field of view displayed by the at least one display apparatus;

control remote rendering of an extended reality (XR) video stream at the at least one display apparatus by dynamically adjusting video compression and foveation parameters of the XR video stream during the smooth pursuit movement (T2) to prioritize visual clarity of the detected object or image region in motion over other elements in the captured field of view;

detect an end of the smooth pursuit movement (T3); and revert the video compression and foveation parameters to pre-set default settings after the end of the smooth pursuit movement (T3).

The present disclosure provides the aforementioned system, configured to provide an enhanced and improved quality of extended reality (XR) experiences during smooth pursuit eye movements. The detection of the start of the smooth pursuit movement (T1) is utilized to dynamically adjust the video compression and foveation parameters of the XR video stream, resulting in an improved clear visual of the moving object at the display apparatus. Therefore, the XR experience of the user to detect the object is improved while maintaining the sharpness of the generated image in focus when the system is in operation. Furthermore, the detection of the smooth pursuit movement and return of the video parameters to their default settings ensures a smooth and comfortable transition by the system. As a result, a real-time adaptation and sensory continuity offered by the aforementioned system work together to create a highly immersive XR experience remotely at the display apparatus that responds to the user's gaze and smooth pursuit movement, leading to the enhancement of the overall quality of the extended reality encounter.

In a second aspect, an embodiment of the present disclosure provides a method comprising:

detecting a start of a smooth pursuit movement (T1) based on eye movement information received from the at least one display apparatus;

detecting an object or image region in motion in a field of view displayed by the at least one display apparatus;

controlling remote rendering of an extended reality (XR) video stream at the at least one display apparatus by dynamically adjusting video compression and foveation parameters of the XR video stream during the smooth pursuit movement (T2) to prioritize visual clarity of the detected object or image region in motion over other elements in the captured field of view;

detecting an end of the smooth pursuit movement (T3); and reverting the video compression and foveation parameters to pre-set default settings after the end of the smooth pursuit movement (T3).

The present disclosure provides the aforementioned method that is used to enhance the quality of extended reality (XR) experiences during smooth pursuit eye movements. The aforementioned method is used to detect the start of smooth pursuit movement (T1) and to dynamically adjust the video compression and foveation parameters, resulting in an improved visual clarity of the movement object. Additionally, the aforementioned method is used to detect the end of the smooth pursuit movement (T3) and revert the video parameters to their pre-set default settings, ensuring a seamless transition and providing a comfortable and uninterrupted XR experience. As a result, a real-time adaptation and sensory continuity offered by the aforementioned method work together to create a highly immersive XR experience that responds to the user's gaze and smooth pursuit movement, which leads to the enhancement of the overall quality of the extended reality encounter.

Throughout the present disclosure, the term "at least one display apparatus" refers to specialized equipment that is capable of at least displaying a video stream. The video stream is to be presented to a user of the at least one display apparatus. It will be appreciated that the term "at least one display apparatus" encompasses a head-mounted display (HMD) device and, optionally, a computing device communicably coupled to the HMD device. The term "head-mounted display" device refers to a specialized equipment that is configured to present an extended-reality (XR) environment to a user when said HMD device, in operation, is worn by said user on his/her head. The HMD device is implemented, for example, as an XR headset, a pair of XR glasses, and the like, that is operable to display a visual scene of the XR environment to the user. Examples of the computing devices include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like. The at least one server could be remotely located from the at least one display apparatus. Optionally, upon foveating the video stream, the at least one server is configured to send the (foveated) video stream to the at least one display apparatus for displaying thereat.

Notably, the at least one server controls the overall operation of the system. The at least one server is communicably coupled to (a processor of) the at least one display apparatus, for example, via a communication network.

Throughout the present disclosure, the term "smooth pursuit movement" refers to a voluntary movement of the eyes in which the user's eyes remain fixed on a moving object. Typically, it is challenging to initiate a smooth pursuit movement of the user's eyes without a discernible moving visual stimulus. Moreover, the eye can only track objects with angular velocity under 30 deg/s, otherwise catch-up saccades are usually needed. It is noteworthy that smooth pursuit exhibits asymmetry, with both the user's eyes and primates demonstrating superior performance in horizontal smooth pursuit movement is minimal.

It will also be appreciated that the eye movement information is received from the at least one display apparatus repeatedly, such as by using eye-tracking means throughout a given session, as the position of the eye of the user may keep changing whilst he/she uses the display apparatus. The eye movement information may comprise images/videos of the user's eye, sensor values, and the like. Optionally, when processing the eye movement information to detect the start of the smooth pursuit movement (T1), the at least one server is configured to employ at least one of: an image processing algorithm, a feature extraction algorithm, a data processing algorithm. Processing the eye movement information to detect the start of the smooth pursuit movement (T1) and the end of the smooth pursuit movement (T3) is well-known in the art. The technical effect of detecting the start of the smooth pursuit movement (T1) and the end of the smooth pursuit movement (T3) is to allow the system to proactively respond to the user's visual intent, leading to a superior, distraction-free user experience when viewing with the object or image region in motion. In addition, the detection of the start of the smooth pursuit movement (T1) is used to ensure minimal latency in adapting to the user's gaze, enhances the overall responsiveness and overall user XR experience, and the detection of the end of the smooth pursuit movement (T3) is used to restore the transport parameters to their original values.

Throughout the present disclosure, the term "object or image region in motion" refers to a computer-generated object (namely, a digital object) or image region in motion in a field of view or a part of remotely streamed foveated video feed of the real world, which is displayed by the at least one display apparatus. Examples of the "object or image region in motion" may include, but are not limited to, a wide range of objects, such as physical objects, virtual objects in the XR environment, or moving elements within a video or image, such as a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and virtual information (such as a virtual news description, a virtual announcement, virtual data, and so forth). Moreover, it will be appreciated to note that when the human eye is in smooth pursuit movement (tracking a moving object), then, in that case, the visual acuity of the rest of the field of view is diminished due to motion blur. Hence, the detection of the object or image region in motion accurately becomes more challenging. In this regard, the term "field of view" displayed by the at least one display apparatus refers to an observable extent of the real-world environment. The field of view is expressed in terms of degrees or radians.

Optionally, the detection of the object or image region in motion in the field of view comprises detecting a shape and a size of the object or image region in motion. In this regard, the system is configured to perform image processing algorithms and computer vision techniques to analyze the eye movement information, which is displayed by the at least one display apparatus in order to detect the shape and size of the object or image region in motion in the field of view. The technical effect of the detection of the shape and the size of the object or image region in motion is to allow the system to distinguish between different objects accurately. As a result, the system is used to provide an improved and realistic image rendering of the objects or image regions in motion in the field of view, thereby enhancing the user experience in XR and computer vision applications by enhancing object recognition, interaction, and realism while reducing cognitive load.

Throughout the present disclosure, the term "remote rendering" refers to the process of generating and rendering visual content, such as images, XR video stream, and the like. In this regard, the term "video compression parameters" refers to a mapping of a "region of interest" for each of the frames, which is compressed. Such "region of interest" can be used to indicate relative priorities for the different regions in the input frame. Herein, the term "region of interest" refers to a region (namely, a portion) within the video stream where the user is focussing or is more likely to focus. In other words, the region of interest is a fixation region within the video stream. Notably, the region of interest has a visual representation that is more noticeable and prominent, as compared to the visual representation in the remaining region(s) within the video stream. In such a case, objects lying within the region of interest are focused onto the foveation of the user's eyes and are resolved to a much greater detail as compared to the remaining object(s) lying outside the region of interest. It will be appreciated that the user is more likely to focus on a region within the video stream that represents, for example, such as a salient feature (namely, a visually alluring feature), a moving object, or a virtual object. For example, the user is more likely to focus on an edge, a corner, or a high-frequency texture detail as compared to interior features or low-frequency texture detail. The user may also be more likely to focus on a central region within the video stream. The region of interest could, for example, be at a centre of a field of view of the video stream, be a top-left region of said the video stream, a bottom-right region of the video stream, or similar. It will be appreciated that as the user's eye keeps changing, the region of interest within the video stream may also change accordingly.

Throughout the present disclosure, the term "foveation parameters" refers to a set of parameters that can be used to adjust the resolution falloff curve, that is the distance (in pixels) from the gaze focus location grows. As a result, the foveation parameters enable the system to determine how fast the effective resolution at that distance diminishes from the maximum resolution at the gaze focus location. The technical effect of controlling remote rendering of an extended reality (XR) video stream at the at least one display apparatus by dynamically adjusting video compression and foveation parameters of the XR video stream during the smooth pursuit movement (T2) to prioritize visual clarity of the detected object or image region in motion over other elements in the captured field of view is to provide more immersive XR experience. As a result, the system is configured to optimize the network usage, maintain realistic object tracking, reduce computational load, and minimize distractions, resulting in a higher quality and user-friendly extended reality encounter. Optionally, the control of the remote rendering of the XR video stream comprises:

tracking the detected object or image region in motion in the field of view displayed by the at least one display apparatus; and detecting and differentiating between a movement of the tracked object or image region in motion from a point of view with respect to a stationary perception of the object or image region in motion from a user's eye perspective during smooth pursuit movement (T2).

In this regard, the at least one server is configured to track the detected object or image region in motion within the field of view displayed by the at least one display apparatus in order to ensure the location, shape, and size of the object or image region in motion. Furthermore, the at least one server is configured to differentiate between the movement of the tracked object and its perceived stationary motion from the user's eye perspective during smooth pursuit movement, such as by analyzing the user's gaze remains fixed on a moving object and further creating the illusion of the object being stationary from their perspective. The technical effect of controlling the remote rendering of the XR video stream is to optimize the rendering of moving objects in an XR environment, particularly during smooth pursuit eye movement (T2). As a result, the at least one server is configured to provide an XR experience that closely aligns with how users naturally perceive and interact with moving objects, leading to enhanced realism and user engagement. For example, the at least one server is configured to adjust the object's appearance and motion in a way that aligns with the user's perspective, making it appear more realistic and seamless during smooth pursuit eye movements.

Optionally, the control of the remote rendering of the XR video stream further comprises executing a video see-through (VST) adjustment to balance between deblur and sharpening parameters, based on the detected differentiation during the smooth pursuit movement (T2).

Herein, the term "video see-through (VST) adjustment" refers to a technique that is used in augmented reality (AR) and mixed reality (MR) display apparatus(es) to provide real-time modification of visual content to create a seamless blend between the real world (captured by a camera) and virtual elements. Examples of the VST adjustment may include, but are not limited to the adjustment of brightness, color, transparency, size of virtual objects, and the like to make them appear more realistic and consistent with the real-world surroundings. Moreover, the term "deblur and sharpening parameters" refers to settings or configurations that control the level of blurriness or sharpness in visual content and can be used to determine how much image smoothing or sharpening should be applied to the displayed content. These settings aim to improve the clarity of visual elements and enable the users to view the objects more distinctly and clearly with fine details or edges. In an implementation, the sharpening parameters are adjusted by kernel size, kernel values, kernel types, and gain of unsharp mask that enables the at least one server to accommodate the fact that even though the tracked object is moving from camera sensor's perspective, it's not moving from the eye's perspective, so change deblur/sharpening settings accordingly.

The technical effect of executing a video see-through (VST) adjustment based on the detected differentiation during smooth pursuit movement (T2), is to optimize the balance between deblur and sharpening parameters for objects or image regions in motion. As a result, such adjustment is used to ensure that moving objects are rendered with optimal visual clarity, aligning with the user's natural perception during smooth pursuit, and creating a more realistic XR experience.

Optionally, the adjusting of the video compression and foveation parameters is based on the size of the object or image region in motion. In this regard, the adjustment of the video compression and foveation parameters are used to determine how visual data is processed and presented within the XR environment and assess the size of the object or image region in motion within the user's field of view.

Moreover, the adjustment of the video compression and foveation parameters based on the size allows the at least one server to ensure that objects, regardless of their size, are rendered with the appropriate level of detail. Therefore, the technical effect of adjusting the video compression and foveation parameters based on the size of the object or image region in motion is to optimize the rendering of moving objects in extended reality (XR) environments to ensure that the objects or image regions in motion are displayed with the appropriate level of detail and visual clarity, contributing to a more realistic and engaging XR experience.

Optionally, the adjusting of the video compression and foveation parameters is further based on a visual acuity curve of a human eye of a user when the at least one display apparatus in operation is worn by the user, and wherein the visual acuity curve is obtained as a part of the eye movements information or is separately obtained from the at least one display apparatus. In this regard, the term "visual acuity curve" represents the user's ability to perceive fine details and sharpness at different distances. In an example, the at least one server is configured to obtain the visual acuity curve as part of the eye movement information received from the display apparatus that provides insights into how the user's eyes detect and track the objects and perceive the details of the object during XR interaction. Alternatively, the visual acuity curve may be separately obtained from the display apparatus in order to reflect the user's unique visual capabilities, allowing for personalized XR rendering. The technical effect of adjusting the video compression and foveation parameters is to enhance the realism and visual clarity to further improve the overall user experience.

Throughout the present disclosure, the term "pre-set default setting" refers to the default settings of the video compression and the foveation parameters that are enabled prior to the start of the smooth pursuit movement. Moreover, the reverting of the video compression and foveation parameters to pre-set default settings after the end of the smooth pursuit movement (T3) that includes restoring the visual parameters that were temporarily adjusted during the smooth pursuit movement back to their original, default configuration once the smooth pursuit eye movement has ended. The technical effect of reverting the video compression and foveation parameters to pre-set default settings after the end of the smooth pursuit movement (T3) is to maintain consistency and avoid potential disorientation or discomfort for the user. Therefore, by returning the visual parameters to their default settings after the specific smooth pursuit movement (T3) concludes, the XR system provides a smooth transition from the enhanced viewing of moving objects to the regular visual settings, ensuring that the XR experience remains seamless and user-friendly. As a result, the system is configured to prevent any abrupt or unexpected changes in visual rendering, promoting a more comfortable and immersive extended reality encounter.

Optionally, the at least one server is further configured to distinguish between the smooth pursuit movement and a vestibulo-ocular reflex (VOR) movement of eye movements by correlating headset pose changes with eye gaze movements of at least one user associated with the at least one display apparatus. In this regard, the term vestibulo-ocular reflex (VOR) movement refers to a reflex acting to stabilize gaze during head movement, with eye movement due to activation of the vestibular system. The vestibulo-ocular reflex acts to stabilize images on the retinas of the eye during head movement. Moreover, the gaze is held steadily on a location by producing eye movements in the direction opposite that of head movement. For example, when the head moves to the right, the eyes move to the left, meaning the image a user views the stays the same even though the position of the head of the user has turned. It is appreciated to note that the slight head movement is present all the time due to which the VOR movement is required for stabilizing the vision. In addition, the smooth pursuit movement can be differentiated from the VOR movement by measuring the headset pose changes in relation to the gaze movement. The technical effect of distinguishing between smooth pursuit movement from the VOR eye movements by correlating headset pose changes with eye gaze movements leads to a more precise, realistic, and engaging XR experience and further optimizes user interaction and alignment with user's behavior, resulting in substantial advantages for the user.

The present disclosure also relates to the method as described above. Various embodiments and variants disclosed above, with respect to the aforementioned system, apply mutatis mutandis to the method.

Optionally, the detecting of the object or image region in motion in the field of view comprises detecting a shape and a size of the object or image region in motion.

Optionally, the adjusting of the video compression and foveation parameters is based on the size of the object or image region in motion.

Optionally, the adjusting of the video compression and foveation parameters is further based on a visual acuity curve of a human eye of a user when the at least one display apparatus in operation is worn by the user, and wherein the visual acuity curve is obtained as a part of the eye movements information or is separately obtained from the at least one display apparatus.

Optionally, the controlling of the remote rendering of the XR video stream comprises:
  tracking the detected object or image region in motion in the field of view displayed by the at least one display apparatus; and
  detecting and differentiating between a movement of the tracked object or image region in motion from a point of view with respect to a stationary perception of the object or image region in motion from a user's eye perspective during smooth pursuit movement (T2).

Optionally, the controlling of the remote rendering of the XR video stream further comprises executing a video see-through (VST) adjustment to balance between deblur and sharpening parameters, based on the differentiation detected during the smooth pursuit movement (T2).

Optionally, the method further comprises distinguishing between the smooth pursuit movement and a vestibulo-ocular reflex (VOR) movement of eye movements by correlating headset pose changes with eye gaze movements of at least one user associated with the at least one display apparatus.

DETAILED DESCRIPTION OF THE DRAWINGS

Referring to FIG. 1, illustrated is a block diagram of an architecture of a system 100 incorporating remote rendering, in accordance with an embodiment of the present disclosure. The system 100 comprises at least one server (for example, depicted as a server 102). The server 102 is communicably coupled to one or more display apparatus (for example, in this case, depicted as display apparatus 104). The server 102 is configured to perform various operations, as described earlier with respect to the aforementioned first aspect.

It may be understood by a person skilled in the art that FIG. 1 includes a simplified architecture of the system 100, for the sake of clarity, which should not unduly limit the scope of the claims herein. It is to be understood that the specific implementation of the system 100 is provided as an example and is not to be construed as limiting it to specific numbers or types of servers, display apparatuses, and congestion control network devices. The person skilled in the art will recognize many variations, alternatives, and modifications of embodiments of the present disclosure.

Figure 2:
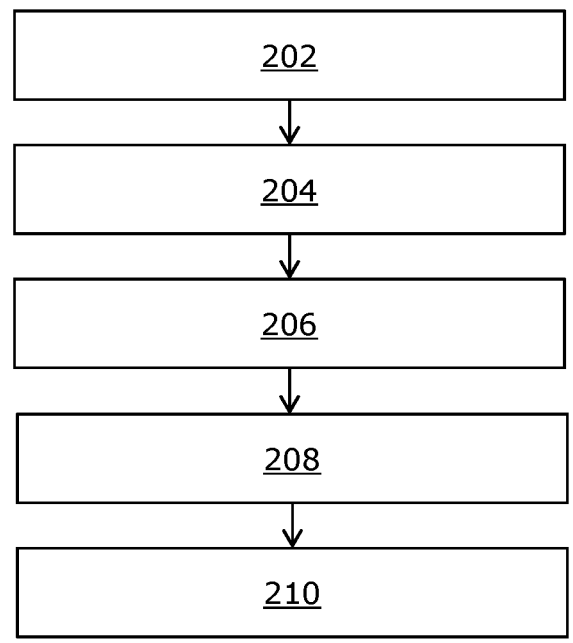
FIG. 2 illustrates steps of a method of remote rendering based on smooth pursuit movement, in accordance with an embodiment of the present disclosure.

Referring to FIG. 2, illustrated are steps of a method incorporating remote rendering, in accordance with an embodiment of the present disclosure. At step 202, a start of a smooth pursuit movement is detected based on eye movement information received from the at least one display apparatus. At step 204, an object or image region in motion is detected in a field of view displayed by the at least one display apparatus. At step 206, the remote rendering of an extended reality (XR) video stream is controlled at the at least one display apparatus by dynamically adjusting video compression and foveation parameters of the XR video stream during the smooth pursuit movement to prioritize visual clarity of the detected object or image region in motion over other elements in the captured field of view. At step 208, an end of the smooth pursuit movement is detected. At step 210, the video compression and foveation parameters to pre-set default settings after the end of the smooth pursuit movement are reverted.

The aforementioned steps are only illustrative and other alternatives can also be provided where one or more steps are added, one or more steps are removed, or one or more steps are provided in a different sequence without departing from the scope of the claims.

Figure 3:
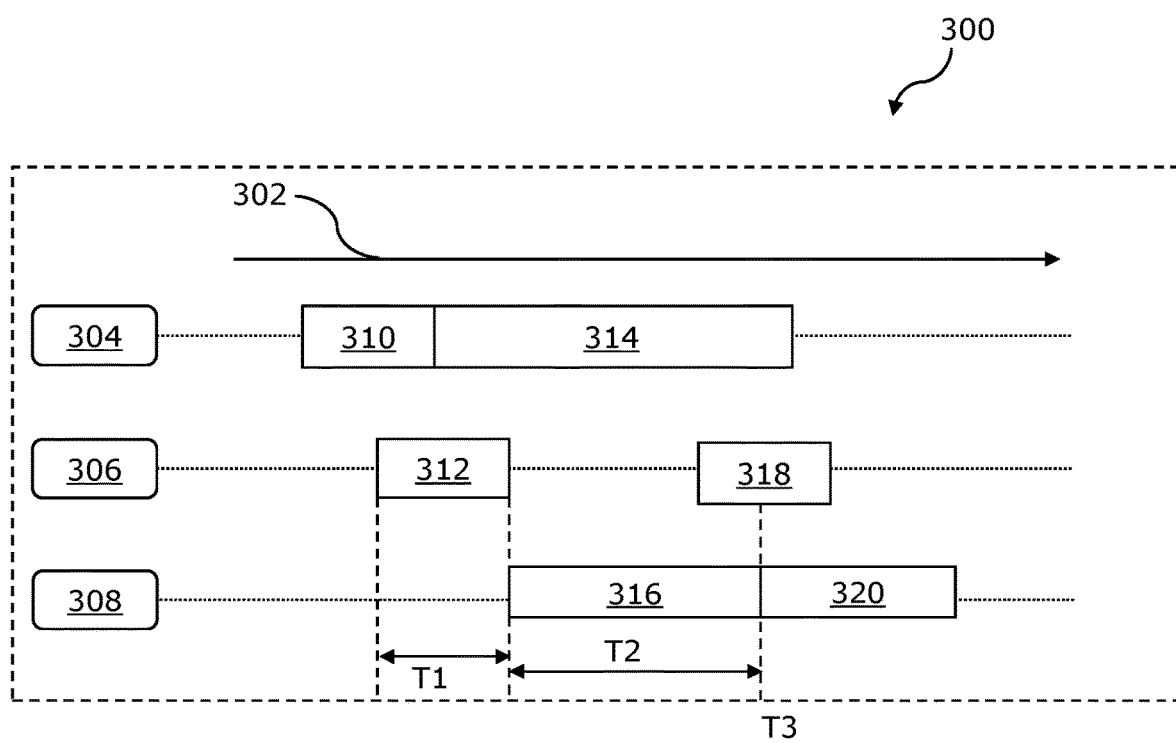
FIG. 3 is an illustration of an exemplary sequence diagram of events in a display apparatus for optimizing image rendering, in accordance with an embodiment of the present disclosure.

Referring to FIG. 3, illustrated is an exemplary sequence diagram of events in the system 100 (of FIG. 1) for optimizing image rendering, in accordance with an embodiment of the present disclosure. In FIG. 3, there is shown an illustration that depicts the sequence 300 of events related to smooth pursuit aware XR transport. There is shown a time axis 302 that depicts the flow of events with respect to time. There is further shown eyes 304 and certain operations, such as gaze-tracking 306 and control of remote rendering 308 of an extended reality (XR) video stream at a display apparatus performed by a server. In an implementation, the control of remote rendering 308 may be a video stream encoding performed by the server for remote rendering of the video stream at the display apparatus.

At 310, the smooth pursuit movement of the eyes 304 is detected. It is observed that smooth pursuits generally always begin with a saccade, which can be detected early on. At 312, the start of the smooth pursuit movement T1 is detected based on the eye movement information received from the display apparatus. In this implementation, the eye movement information comprises the gaze-tracking data.

At 314, the smooth pursuit movement of the eyes 304 is ongoing but saccade ends. At 316, the remote rendering 308 of the XR video stream at the display apparatus is controlled by the server during the smooth pursuit movement T2 by dynamically adjusting video compression and foveation parameters of the XR video stream to prioritize visual clarity of the detected object or image region in motion over other elements in the captured field of view.

At 318, the end of the smooth pursuit movement T3 is detected by the server based on the eye movement information received from the display apparatus. At 320, the video compression and foveation parameters are reverted to pre-set default settings after the end of the smooth pursuit movement T3. As a result, the smooth pursuit aware XR rendering is achieved, thereby improving image quality, and reducing latency in the display apparatus (e.g., an XR headset).

FIG. 3 is merely an example, which should not unduly limit the scope of the claims herein. A person skilled in the art will recognize many variations, alternatives, and modifications of embodiments of the present disclosure.

The invention claimed is:

1. A system comprising at least one server that is communicably coupled to at least one display apparatus, wherein the at least one server is configured to:
   detect a start of a smooth pursuit movement (T1) based on eye movement information received from the at least one display apparatus;
   detect an object or image region in motion in a field of view displayed by the at least one display apparatus;
   control remote rendering of an extended reality (XR) video stream at the at least one display apparatus by dynamically adjusting video compression and foveation parameters of the XR video stream during the smooth pursuit movement (T2) to prioritize visual clarity of the detected object or image region in motion over other elements in the displayed field of view;
   detect an end of the smooth pursuit movement (T3); and
   revert the video compression and foveation parameters to pre-set default settings after the end of the smooth pursuit movement (T3).

2. The system of claim 1, wherein the detection of the object or image region in motion in the field of view comprises detecting a shape and a size of the object or image region in motion.

3. The system of claim 1, wherein the adjusting of the video compression and foveation parameters is based on the size of the object or image region in motion.

4. The system of claim 1, wherein the adjusting of the video compression and foveation parameters is further based on a visual acuity curve of a human eye of a user when the at least one display apparatus in operation is worn by the user, and wherein the visual acuity curve is obtained as a part of the eye movements information or is separately obtained from the at least one display apparatus.

5. The system of claim 1, wherein the control of the remote rendering of the XR video stream comprises:
   tracking the detected object or image region in motion in the field of view displayed by the at least one display apparatus; and
   detecting and differentiating between a movement of the tracked object or image region in motion from a point of view of with respect to a stationary perception of the object or image region in motion from a user's eye perspective during smooth pursuit movement (T2).

6. The system of claim 5, wherein the control of the remote rendering of the XR video stream further comprises executing a video see-through (VST) adjustment to balance between deblur and sharpening parameters, based on the detected differentiation during the smooth pursuit movement (T2).

7. The system of claim 1, wherein the at least one server is further configured to distinguish between the smooth pursuit movement and a vestibulo-ocular reflex (VOR) movement of eye movements by correlating headset pose changes with eye gaze movements of at least one user associated with the at least one display apparatus.

8. A method of remote rendering implemented by at least one server, the method comprising:

detecting a start of a smooth pursuit movement (T1) based on eye movement information received from the at least one display apparatus;

detecting an object or image region in motion in a field of view displayed by the at least one display apparatus;

controlling remote rendering of an extended reality (XR) video stream at the at least one display apparatus by dynamically adjusting video compression and foveation parameters of the XR video stream during the smooth pursuit movement (T2) to prioritize visual clarity of the detected object or image region in motion over other elements in the captured field of view;

detecting an end of the smooth pursuit movement (T3); and reverting the video compression and foveation parameters to pre-set default settings after the end of the smooth pursuit movement (T3).

9. The method of claim 8, wherein the detecting of the object or image region in motion in the field of view comprises detecting a shape and a size of the object or image region in motion.

10. The method of claim 8, wherein the adjusting of the video compression and foveation parameters is based on the size of the object or image region in motion.

11. The method of claim 10, wherein the adjusting of the video compression and foveation parameters is further based on a visual acuity curve of a human eye of a user when the at least one display apparatus in operation is worn by the user, and wherein the visual acuity curve is obtained as a part of the eye movements information or is separately obtained from the at least one display apparatus.

12. The method of claim 8, wherein the controlling of the remote rendering of the XR video stream comprises:

tracking the detected object or image region in motion in the field of view displayed by the at least one display apparatus; and detecting and differentiating between a movement of the tracked object or image region in motion from a point of view with respect to a stationary perception of the object or image region in motion from a user's eye perspective during smooth pursuit movement (T2).

13. The method of claim 12, wherein the controlling of the remote rendering of the XR video stream further comprises executing a video see-through (VST) adjustment to balance between deblur and sharpening parameters, based on the differentiation detected during the smooth pursuit movement (T2).

14. The method of claim 8, further comprising distinguishing between the smooth pursuit movement and a vestibulo-ocular reflex (VOR) movement of eye movements by correlating headset pose changes with eye gaze movements of at least one user associated with the at least one display apparatus.

* * * * *